March 4, 1930. J. BLAND 1,749,371
APPARATUS AND PROCESS FOR MINERALS SEPARATION
Filed Sept. 20, 1926
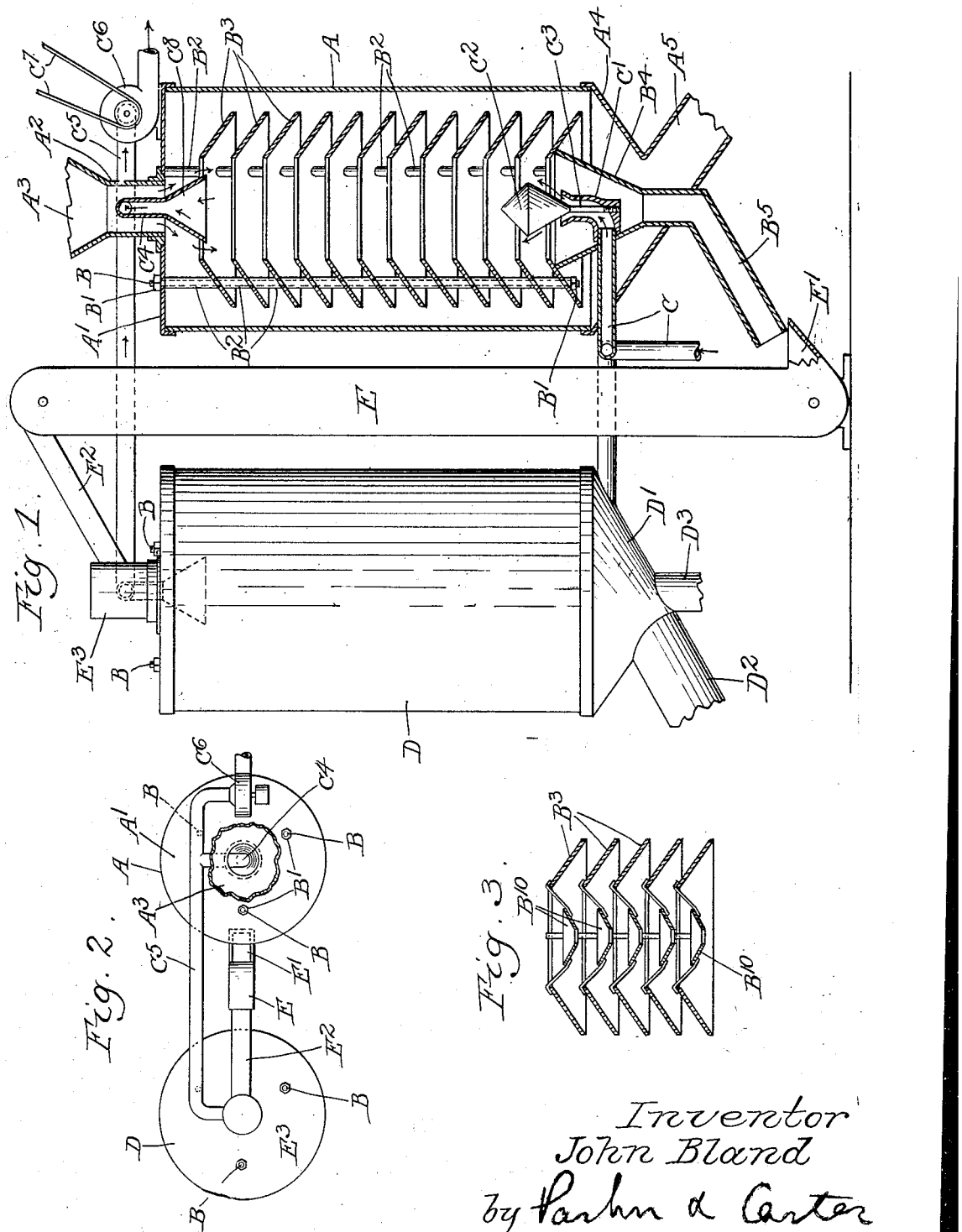

Patented Mar. 4, 1930

1,749,371

UNITED STATES PATENT OFFICE

JOHN BLAND, OF TINTON, SOUTH DAKOTA

APPARATUS AND PROCESS FOR MINERALS SEPARATION

Application filed September 20, 1926. Serial No. 136,406.

My invention relates to a process of and apparatus for separating materials and has for particular purpose an improved method and apparatus for separating materials in which flat and granular particles are mixed. A particular application of my invention is to the separation of mica from granular material which may be mixed, for example with feldspar.

I illustrate my invention more or less diagrammatically in the accompanying drawings, wherein—

Figure 1 is a schematic side elevation with parts in section; and

Figure 2 is a plan view on a reduced scale, with parts broken away; and

Figure 3 is a partial vertical section through a variant form.

Like parts are indicated by like symbols throughout the specification and drawings.

A indicates a housing having the upper closure $A^1$ apertured to receive the feed chute or spout $A^2$ which may be associated with any suitable funnel or hopper $A^3$. $A^4$ is a hopper closing the bottom of the housing A and delivering for example to the chute $A^5$.

Depending from the cover $A^1$ are any suitable supporting members or rods B with their holding nuts $B^1$. Spaced along them by the spacing sleeves $B^2$, are a plurality of annular baffles or vanes $B^3$ each downwardly and outwardly inclined from its central aperture. $B^4$ indicates a hopper underlying the central apertures of said baffles and communicating with the chute $B^5$ adapted to pass outwardly through the wall of the hopper $A^4$ or the chute $A^5$.

C indicates any suitable air line extending to any suitable supply of compressed air and passing through the hopper walls $A^4$ and $B^4$ to the upwardly turned elbow $C^1$ aligned with the center of the apertures of the baffles $B^3$. In order to prevent the penetration of falling material it may be provided with the double conic deflector or guard $C^2$ mounted for example upon the stem $C^3$, screw threaded into the bottom of the elbow $C^1$.

$C^4$ is an air outlet pipe or suction connection extending to the suction line $C^5$ whence air is exhausted for example by means of the fan or blower $C^6$ driven by the belt $C^7$ from any suitable power source. The passage $C^4$ is downwardly and outwardly flared as at $C^3$ in order to gather air from a maximum area, the portion $C^8$ having the additional function of delivering a column of falling material to cylindrical form, or annular in cross-section.

D indicates an additional unit substantially identical with A and provided with the hopper $D^1$ and chute $D^2$ for the material received by the baffles. $D^3$ is a spout for the granular material or tailings dropping through the central aperture of the baffles.

In order to supply material to the member D I provide any suitable conveyor element E, the details of which form no part of the present invention, with the bottom hopper $E^1$ adapted to receive tailings from the chute $B^5$ and the upper discharge passage $E^2$ adapted to deliver said tailings to the upper inlet or discharge member $E^3$ of the unit D.

Referring to Figure 3 the baffles $B^3$ are supplemented by inner concentric baffles $B^{10}$. In the structure of Figure 3, which should be read in connection with the more complete showing of Figure 1, the deflector $C^8$ delivers the material to be separated to the space within the baffles $B^3$ in an annular stream. The mica which flows or eddies out of the annular stream is received either on the baffles $B^3$ or the baffles $B^{10}$, being thereby separated from the heavier and directly falling material, for further handling.

It will be realized that whereas I have illustrated and described a practical and operative device nevertheless many changes might be made in the size, shape, number and disposition of parts without departing from the spirit of my invention, and I therefore wish my description and drawings to be taken as in a broad sense illustrative or diagrammatic rather than as limiting me to my specific description and showing.

The use and operation of my invention are as follows:

The problem solved by my novel device and apparatus is the separation of mixed particles part of which are flat and part of which are granular. In other words some of the particles have a far greater exposed surface than others, in proportion to their mass, and such particles are, for example in the case of mica, prevailingly flat. The mixed materials may if necessary be first reduced, for example by crushing, to a relatively small size. The mixed mass is then delivered to the hopper $A^3$ and passes downwardly through the passage $A^2$ and across the cone $C^8$ and falls, in a stream of annular cross-section, within the inner edges of the baffles $B^3$. The mica particles tend to eddy or volplane laterally and I therefore provide the baffles $B^3$ and $B^{10}$, in order to intercept the laterally eddying material. It is preferable, although not absolutely necessary, to employ an upwardly rising current of air. This air should be of sufficient velocity to separate the flat particles, or cause them to eddy, without at the same time substantially affecting the downward fall of the granular particles.

Where I wish to preserve and employ both the granular and the flat particles I find it desirable to employ two or more units. For example in the first unit I may employ a relatively gentle current of air sufficient to remove a large proportion of the flat particles but insufficient to deflect the falling granular material. In such case, as by the chute $A^5$, I take off the flat particles unmixed with the granular particles. However the separation is incomplete and the tailings passing off along the chute $B^9$ may be largely granular but will include a considerable proportion of the flat particles.

I may then feed these tailings to a second unit which may, if desired, be longer than the first, and which may employ a greater blast of air. As a result all or substantially all of the flat particles are driven out of the falling granular material but some of the granular material may become deflected and pass off across the separating baffles. When my apparatus is so used I obtain from the discharge chute $D^2$ mica with some granular mixture. The discharge from $A^5$ will be exclusively of flat particles, for example mica, and the discharge from $D^3$ will be purely granular, for example feldspar. There remains the mixed mica and granular tailings of the chute $D^2$. In cases where the mixed mica is useful no further separation is necessary, but if only the pure product is desired the material from the chute $D^2$ may be returned to the stream of material undergoing separation, and may be passed either to the hopper $A^3$ or to the member $E^3$, to pass through one or the other of the separate units A or D.

It will be realized that whereas I am illustrating an installation with two units, I do not wish to be limited to two. I may employ a single unit or I may employ a larger number than two.

In Figure 3 I illustrate a variant form in which baffles $B^{10}$ are inserted in the cylindrical space bounded by the annular baffles. It will be realized that whereas I have shown the material as falling in a cylindrical or annular stream, that the cross-section of the falling stream may be varied to suit the particular conditions and that I do not wish to be limited to my particular showing.

I claim:

1. The method of separating relatively flat, relatively light, particles from granular particles which includes causing a stream of such mixed materials to drop downwardly along a predetermined axis and directing upwardly along said axis a current of air sufficient to cause the flat particles to eddy laterally, while insufficient to resist the downward movement of the granular particles or to impart substantial upward movement to the flat particles.

2. The method of separating relatively flat, relatively light particles from granular particles, which includes initiating by gravity the downward movement of such particles along a predetermined generally vertical axis or zone, directing air upwardly along said axis or through said zone, the velocity of the air being sufficient to cause the flat particles to eddy laterally, while insufficient substantially to affect the downward movement of the granular particles, and thereby affecting a lateral separation of the flat particles in response to their tendency to eddy or volplane laterally out of the axis or zone of downward movement of the heavy particles.

3. The method of separating mixed substances including relatively flat, light particles, from granular particles, which includes initiating the downward movement of such mixed substance along a generally vertical axis or zone of separation, delivering to such zone of separation air at a velocity sufficient to cause the flat particles to eddy laterally, and taking off the laterally eddying particles for separate disposal, the fall or downward movement of the mixed materials being maintained through a vertical length or height sufficient to cause substantially all of the flat particles to eddy laterally before reaching the bottom of said zone of separation.

4. The method of separating relatively flat, relatively light particles having large areas in relation to their weight, from particles having a relatively smaller area in relation to their weight, which includes initiating the downward movement of a mixed substance including both types of particles along a generally vertical axis or zone of separation; delivering upwardly along said zone of separation air at velocity or pressure sufficient to cause the flat particles to eddy laterally, and taking off for separate disposal such particles as eddy or volplane laterally out of the axis or zone of separation.

5. The method of separating relatively flat, relatively light particles having large areas in relation to their weight, from particles having a relatively smaller area in relation to their weight, which includes initiating the downward movement of a mixed substance including both types of particles along a generally vertical axis or zone of separation, delivering upwardly along said zone of separation air at velocity or pressure sufficient to cause the flat particles to eddy laterally, and taking off for separate disposal such particles as eddy or volplane laterally out of the axis or zone of separation, the fall or downward movement of the mixed materials being maintained through a height sufficient to permit substantially all of the flat particles to eddy laterally out of the axis or zone of separation, before reaching its bottom.

6. A material separting device for separating relatively flat particles from a mixed mass of material which includes means for delivering for a downward fall by gravity a stream of such mixed materials, means, vertically aligned with said delivery means, and separated therefrom by a free space, for re-reciving such particles of such mixed material as fall vertically and substantially vertically, means for directing a current of air upwardly through the space between the delivery means and the receiving means, and a plurality of separation members, positioned laterally out of line with the delivery and the receiving member, adapted to receive and direct the laterally eddying flat particles, and a final receiving member adapted to receive the flat particles delivered thereby.

7. A material separating device for separating relatively flat particles from a mixed mass of material which includes means for delivering for a downward fall by gravity a stream of such mixed materials, means, vertically aligned with said delivery means, and separated therefrom a free space, for receiving such particles of such mixed material as fall vertically and substantially vertically, means for directing a current of air upwardly through the space between the delivery means and the receiving means, and a plurality of separation members, positioned laterally out of line with the delivery and the receiving member, adapted to receive and direct the laterally eddying flat particles, and a final receiving member adapted to receive the flat particles delivered thereby, said separation units including a plurality of circumferential vertically spaced vanes.

8. A material separating device for separating relatively flat particles from a mixed mass of material which includes means for delivering for a downward fall by gravity a stream of such mixed materials, means, vertically aligned with said delivery means, and separated therefrom by a free space, for receiving such particles of such mixed material as fall vertically and substantially vertically, means for directing a current of air upwardly through the space between the delivery means and the receiving means, and a plurality of separation members, positioned laterally out of line with the delivery and the receiving member, adapted to receive and direct the laterally eddying flat particles, and a final receiving member adapted to receive the flat particles delivered thereby, said separation units including a plurality of circumferential vertically spaced vanes, the inner edges thereof surrounding the vertical free space between delivery means and receiving means, said vanes inclining downwardly from their inner to their outer edges.

Signed at Deadwood, county of Lawrence and State of South Dakota, this 12th day of August, 1926.

JOHN BLAND.